US010689998B2

(12) United States Patent
Stapleton et al.

(10) Patent No.: US 10,689,998 B2
(45) Date of Patent: Jun. 23, 2020

(54) SHROUDS AND METHODS FOR FORMING TURBINE COMPONENTS

(71) Applicant: General Electric Company, Schenectady, NY (US)

(72) Inventors: David Scott Stapleton, Boston, MA (US); Robert Charles Groves, II, West Chester, OH (US)

(73) Assignee: General Electric Company, Schenectady, NY (US)

( * ) Notice: Subject to any disclaimer, the term of this patent is extended or adjusted under 35 U.S.C. 154(b) by 566 days.

(21) Appl. No.: 14/882,909

(22) Filed: Oct. 14, 2015

(65) Prior Publication Data

US 2017/0107840 A1    Apr. 20, 2017

(51) Int. Cl.
| | |
|---|---|
| *F01D 11/24* | (2006.01) |
| *F01D 25/24* | (2006.01) |
| *F01D 11/08* | (2006.01) |
| *F01D 25/00* | (2006.01) |
| *F01D 25/12* | (2006.01) |

(Continued)

(52) U.S. Cl.
CPC .............. *F01D 11/24* (2013.01); *F01D 11/08* (2013.01); *F01D 25/005* (2013.01); *F01D 25/12* (2013.01); *F01D 25/246* (2013.01); *F02C 3/04* (2013.01); *F04D 29/023* (2013.01); *F04D 29/526* (2013.01); *F04D 29/582* (2013.01); *F04D 29/644* (2013.01); *F05D 2220/32* (2013.01); *F05D 2230/60* (2013.01);
(Continued)

(58) Field of Classification Search
CPC . F01D 9/04; F01D 9/047; F01D 9/042; F01D 9/06; F01D 9/02; F01D 9/00; F01D 25/12; F01D 11/24
See application file for complete search history.

(56) References Cited

U.S. PATENT DOCUMENTS

| | | | |
|---|---|---|---|
| 8,128,344 B2 * | 3/2012 | McGovern | .............. F01D 11/08 |
| | | | 415/116 |
| 2015/0007581 A1 * | 1/2015 | Sezer | ...................... F01D 11/24 |
| | | | 60/806 |
| 2016/0138406 A1 | 5/2016 | Freeman | |

FOREIGN PATENT DOCUMENTS

| | | |
|---|---|---|
| EP | 1 215 183 A1 | 6/2002 |
| EP | 2060745 A2 | 5/2009 |

(Continued)

OTHER PUBLICATIONS

European Search Report and Opinion issued in connection with corresponding EP Application No. 16192777.7 dated Feb. 17, 2017.

(Continued)

*Primary Examiner* — Craig Kim
(74) *Attorney, Agent, or Firm* — Dority & Manning, P.A.

(57) ABSTRACT

Shrouds and methods for forming turbine components are provided. A shroud includes a shroud body which includes a forward surface, a rear surface axially spaced from the forward surface, an inner surface extending between the forward surface and the rear surface, and an outer surface extending between the forward surface and the rear surface and radially spaced from the inner surface. The shroud further includes a forward flange extending from the outer surface of the shroud body, and a rear flange extending from the outer surface of the shroud body, the rear flange axially spaced from the forward flange. The shroud further includes a cooling passage defined in the shroud, the cooling passage extending generally circumferentially through the shroud.

20 Claims, 8 Drawing Sheets

(51) Int. Cl.
*F02C 3/04* (2006.01)
*F04D 29/02* (2006.01)
*F04D 29/52* (2006.01)
*F04D 29/58* (2006.01)
*F04D 29/64* (2006.01)

(52) U.S. Cl.
CPC ...... *F05D 2240/11* (2013.01); *F05D 2260/20* (2013.01); *F05D 2300/6033* (2013.01)

(56) References Cited

FOREIGN PATENT DOCUMENTS

| EP | 3 026 216 A1 | | 6/2016 |
|---|---|---|---|
| JP | 2007-071185 A | | 3/2007 |
| JP | 2007071185 A | * | 3/2007 |

OTHER PUBLICATIONS

Extended European Search Report and Opinion issued in connection with corresponding EP Application No. 16192777.7 dated May 30, 2017.

* cited by examiner

SHROUDS AND METHODS FOR FORMING TURBINE COMPONENTS

FIELD OF THE INVENTION

The present subject matter relates generally to a shrouds and methods for forming turbine components for gas turbine engines. More particularly, the present subject matter relates to shrouds and methods which provide improved cooling features.

BACKGROUND OF THE INVENTION

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor blades, rotor disks and retainers, and various stationary turbine components such as stator vanes or nozzles, turbine shrouds and engine frames. The rotatable and the stationary turbine components at least partially define the hot gas path through the turbine section. As the combustion gases flow through the hot gas path, thermal energy is transferred from the combustion gases to the rotatable turbine components and the stationary turbine components.

In general, the HP turbine and LP turbine may additionally include shroud assemblies which further define the hot gas path. A clearance gap may be defined between the shroud of a shroud assembly and the rotatable turbine components of an associated stage of rotatable turbine components. The shroud is typically retained within the gas turbine engine by a shroud hanger, which in turn is coupled to various other components of the engine.

One issue with presently known shroud assemblies is the high temperatures experienced by the shrouds during operation of the gas turbine engine, and particularly temperature gradients experienced within the shrouds due to such high temperatures. Such temperature gradients can cause stresses in the shrouds and thus affect the durability of the shrouds. One particular area of concern in some shrouds is the portion of the shroud body that is adjacent the aft flange of the shroud. These issues are of increased concern when the shrouds are formed from ceramic matrix composite materials.

Another concern with shrouds and other turbine components formed from ceramic matrix composite materials is the formation of suitable cooling passages therein. Drilling to form the cooling holes may be undesirable and, in some cases due to the desired positioning of the cooling passages, impossible.

Accordingly, improved shrouds and methods for forming turbine components are desired. In particular, shrouds and methods for forming turbine components which facilitate improved cooling would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a shroud for a gas turbine engine is provided. The shroud includes a shroud body which includes a forward surface, a rear surface axially spaced from the forward surface, an inner surface extending between the forward surface and the rear surface, and an outer surface extending between the forward surface and the rear surface and radially spaced from the inner surface. The shroud further includes a forward flange extending from the outer surface of the shroud body, and a rear flange extending from the outer surface of the shroud body, the rear flange axially spaced from the forward flange. The shroud further includes a cooling passage defined in the shroud, the cooling passage extending generally circumferentially through the shroud.

In accordance with another embodiment of the present disclosure, a gas turbine engine is provided. The gas turbine engine includes a compressor, a combustion section, a turbine, and a shroud disposed in one of the compressor or the turbine. The shroud includes a shroud body which includes a forward surface, a rear surface axially spaced from the forward surface, an inner surface extending between the forward surface and the rear surface, and an outer surface extending between the forward surface and the rear surface and radially spaced from the inner surface. The shroud further includes a forward flange extending from the outer surface of the shroud body, and a rear flange extending from the outer surface of the shroud body, the rear flange axially spaced from the forward flange. The shroud further includes a shroud body which includes a forward surface, a rear surface axially spaced from the forward surface, an inner surface extending between the forward surface and the rear surface, and an outer surface extending between the forward surface and the rear surface and radially spaced from the inner surface. The shroud further includes a cooling passage defined in the shroud, the cooling passage extending generally circumferentially through the shroud.

In accordance with another embodiment of the present disclosure, a method for forming a ceramic matrix composite turbine component is provided. The method includes providing one or more ceramic matrix composite plies around a core, curing the one or more ceramic matrix composite plies to form a filler component, assembling the filler component and a ply component together, the ply component including a stacked plurality of ceramic matrix composite plies, and curing the filler component and the ply component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference.

Figure 1:
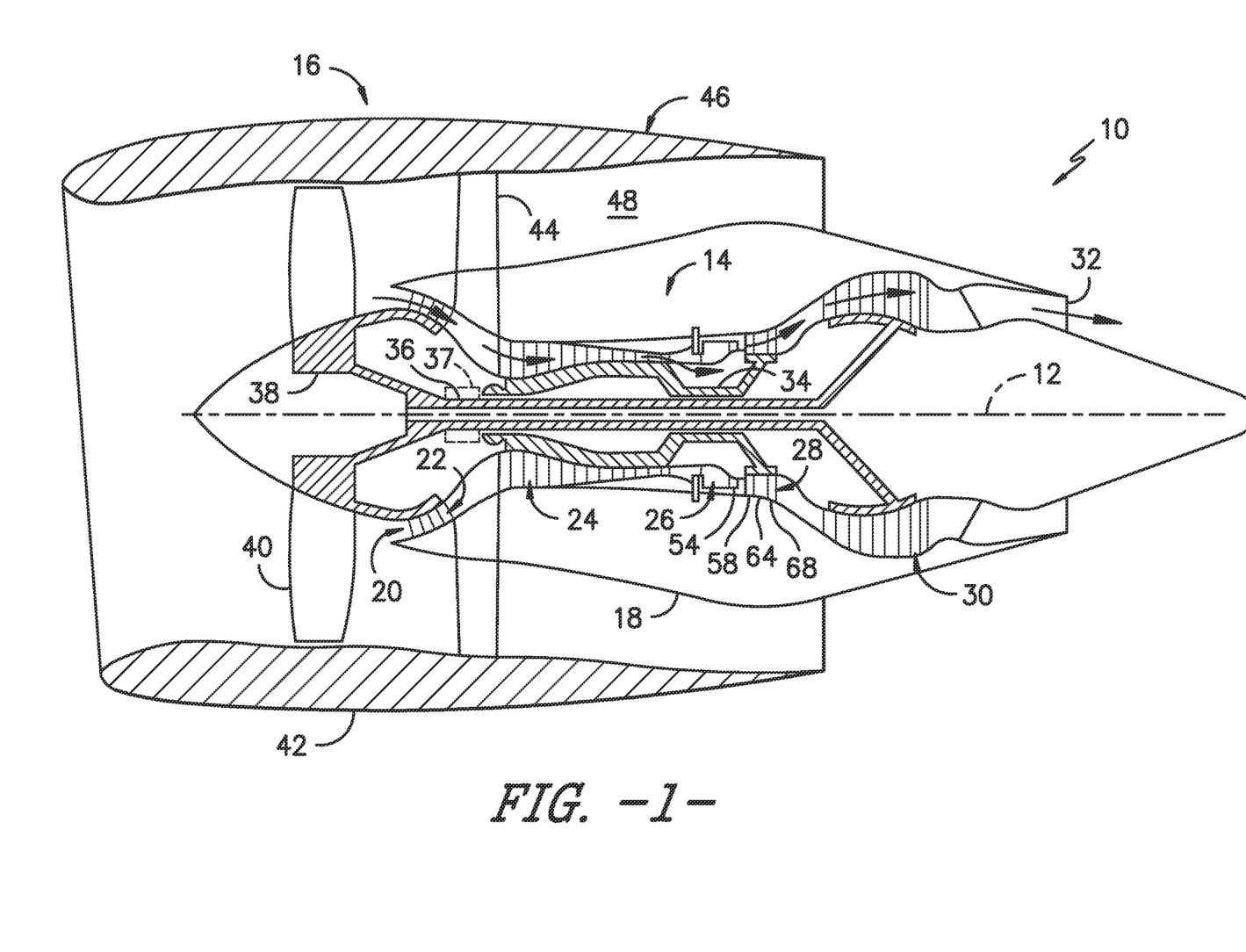
FIG. 1 is a schematic cross-sectional view of a gas turbine engine in accordance with one embodiment of the present disclosure.

Referring now to the drawings, FIG. 1 is a schematic cross-sectional view of an exemplary high-bypass turbofan type engine 10 herein referred to as "turbofan 10" as may incorporate various embodiments of the present disclosure. As shown in FIG. 1, the turbofan 10 has a longitudinal or axial centerline axis 12 that extends therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) spool 36 may also be connected to a fan spool or shaft 38 of the fan section 16. In particular embodiments, the (LP) spool 36 may be connected directly to the fan spool 38 such as in a direct-drive configuration. In alternative configurations, the (LP) spool 36 may be connected to the fan spool 38 via a speed reduction device 37 such as a reduction gear gearbox in an indirect-drive or geared-drive configuration. Such speed reduction devices may be included between any suitable shafts/spools within engine 10 as desired or required.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 (downstream of the guide vanes 44) may extend over an outer portion of the gas turbine engine 14 so as to define a bypass airflow passage 48 therebetween.

Figure 2:
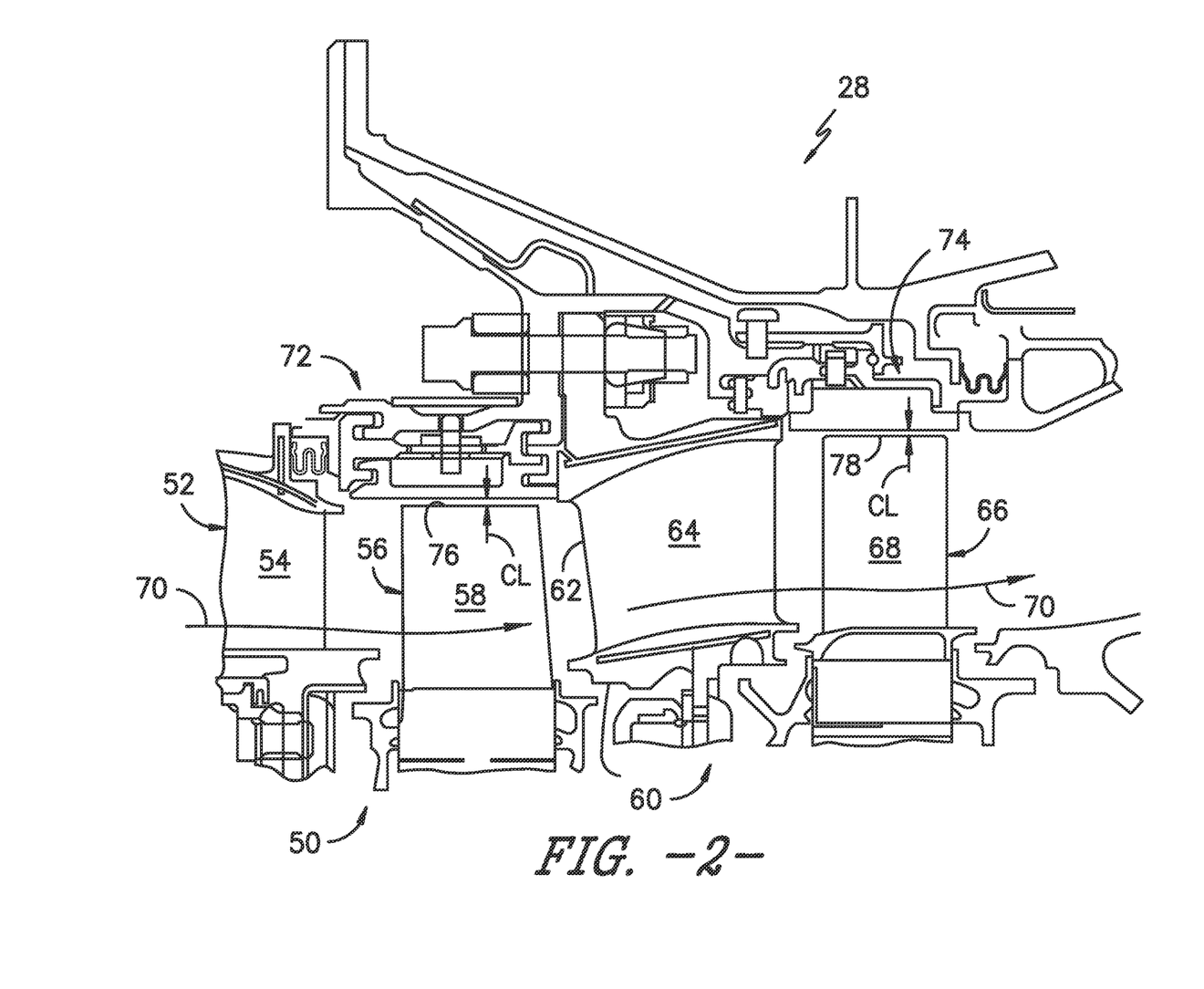
FIG. 2 is an enlarged cross sectional side view of a high pressure turbine portion of a gas turbine engine in accordance with one embodiment of the present disclosure.

FIG. 2 provides an enlarged cross sectioned view of the HP turbine 28 portion of the gas turbine engine 14 as shown in FIG. 1, as may incorporate various embodiments of the present invention. As shown in FIG. 2, the HP turbine 28 includes, in serial flow relationship, a first stage 50 which includes an annular array 52 of stator vanes 54 (only one shown) axially spaced from an annular array 56 of turbine rotor blades 58 (only one shown). The HP turbine 28 further includes a second stage 60 which includes an annular array 62 of stator vanes 64 (only one shown) axially spaced from an annular array 66 of turbine rotor blades 68 (only one shown). The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a hot gas path 70 for routing combustion gases from the combustion section 26 (FIG. 1) through the HP turbine 28.

As further shown in FIG. 2, the HP turbine may include one or more shroud assemblies, each of which forms an annular ring about an annular array of rotor blades. For example, a shroud assembly 72 may form an annular ring around the annular array 56 of rotor blades 58 of the first stage 50, and a shroud assembly 74 may form an annular ring around the annular array 66 of turbine rotor blades 68 of the second stage 60. In general, shrouds of the shroud assemblies 72, 74 are radially spaced from blade tips 76, 78 of each of the rotor blades 68. A radial or clearance gap CL is defined between the blade tips 76, 78 and the shrouds. The shrouds and shroud assemblies generally reduce leakage from the hot gas path 70.

It should be noted that shrouds and shroud assemblies may additionally be utilized in a similar manner in the low pressure compressor 22, high pressure compressor 24, and/or low pressure turbine 30. Accordingly, shrouds and shrouds assemblies as disclosed herein are not limited to use in HP turbines, and rather may be utilized in any suitable section of a gas turbine engine.

Referring now to FIGS. 3 through 8, improved shroud assemblies 100 and shrouds 102 therefor are disclosed. Shroud assemblies 100 as disclosed herein may be utilized in place of shroud assemblies 72, 74, as discussed above, or any other suitable shroud assemblies in an engine 10. Similarly, shrouds 102 as disclosed herein may be utilized in place of shrouds 76, 78, as discussed above, or any other suitable shrouds in an engine 10.

Shrouds 102 and shroud assemblies 100 in accordance with the present disclosure provide a number of advantages. In particular, shrouds 102 in accordance with the present disclosure include cooling passages which facilitate improved cooling of the shrouds 102 during engine 10 operation. The cooling passages are advantageously located within the shrouds 102 to reduce thermal gradients within the shrouds 102, thus reducing stresses and increasing the durability of the shrouds 102.

Figure 3:
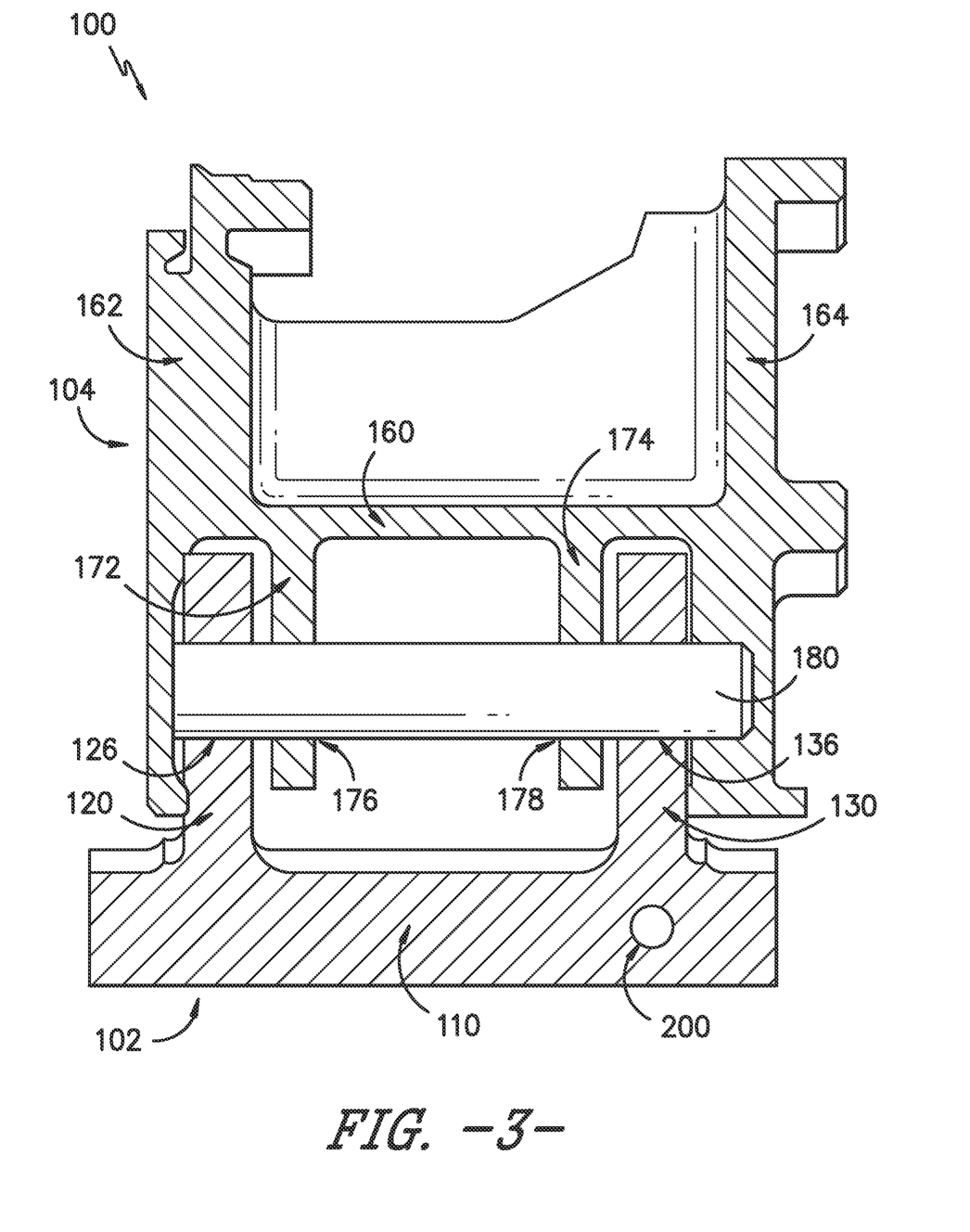
FIG. 3 is a cross-sectional view of a shroud assembly in accordance with one embodiment of the present disclosure.
Figure 4:
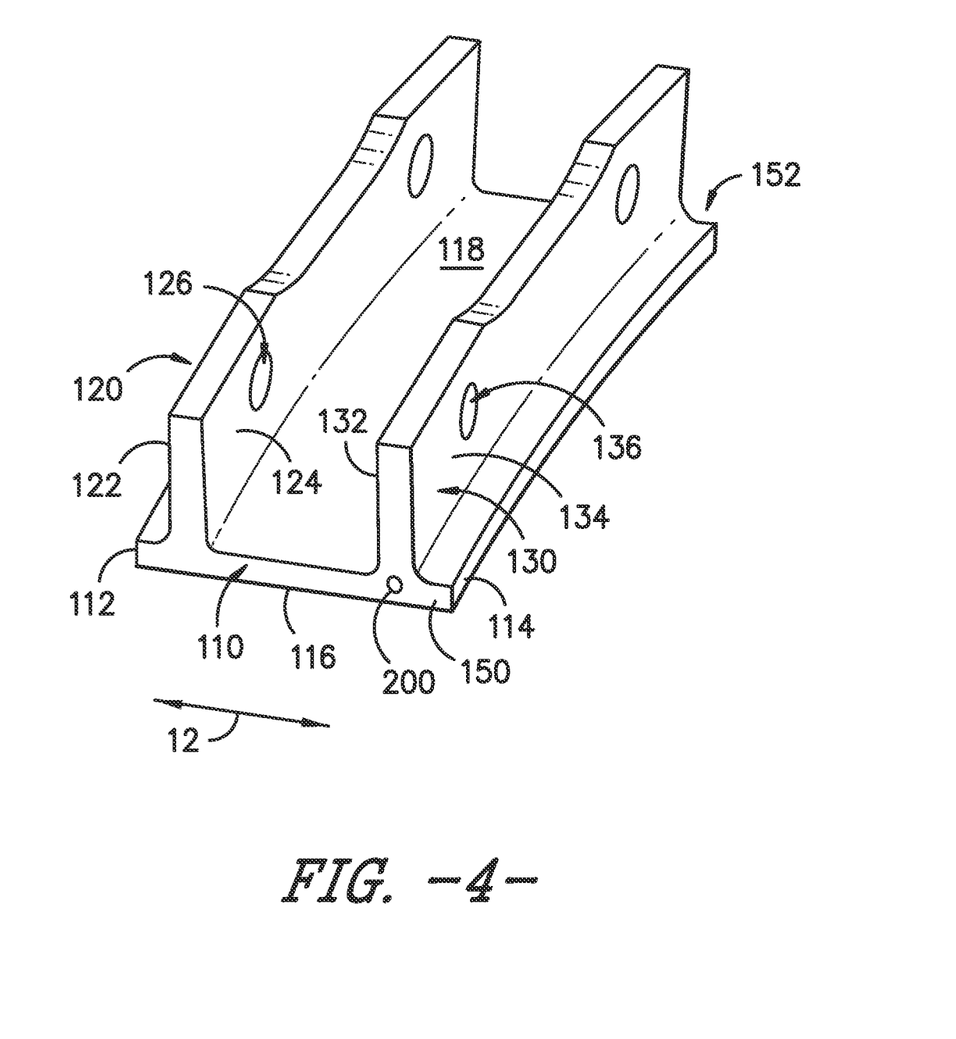
FIG. 4 is a perspective view of a shroud in accordance with one embodiment of the present disclosure.
Figure 5:
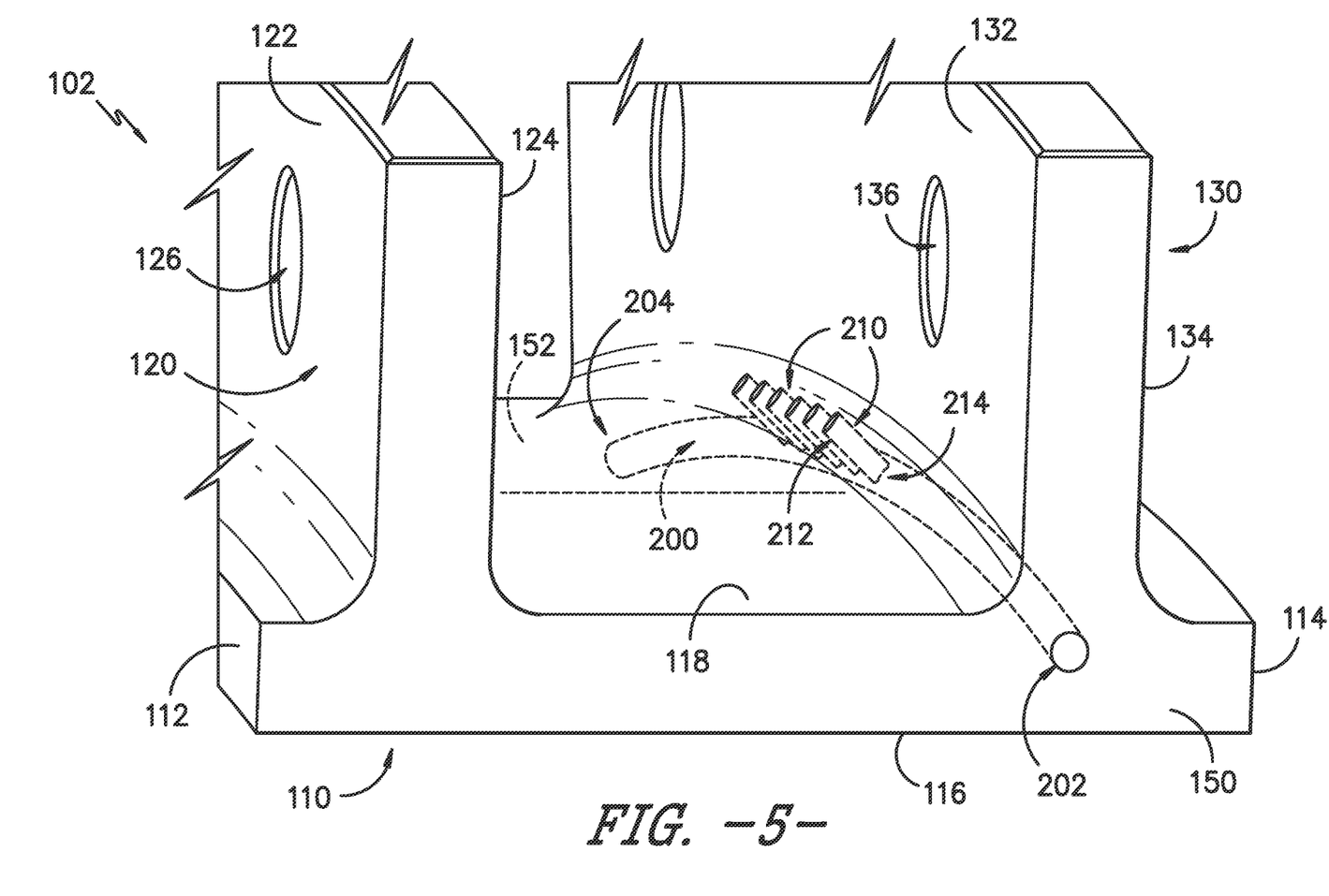
FIG. 5 is another perspective view, with internal passages illustrated, of a shroud in accordance with one embodiment of the present disclosure.

FIG. 3 illustrates a shroud assembly 100, which includes a shroud 102 and a hanger 104 in accordance with the present disclosure. FIGS. 4 and 5 illustrate various embodiments of a shroud 102 in accordance with the present disclosure. A shroud 102 in accordance with the present disclosure may include, for example, a shroud body 110, and may further include one or more flanges, such as a forward flange 120 and a rear flange 130 as shown. In exemplary embodiments, the shroud body 110 and flanges 120, 130 (and shroud 102 in general) may be formed from a CMC material, although in alternative embodiments the shroud body 110 and flanges 120, 130 (and shroud 102 in general) may be formed from another suitable material such as a metal, etc. In particular, in exemplary embodiments, shroud body 110 and flanges 120, 130 may be integral and thus generally formed as a single component.

Shroud body 110 may include a forward surface 112 and a rear surface 114. The rear surface 114 is axially spaced from the forward surface 112, such as generally along the centerline 12 when in the engine 10. An inner surface 116 and an outer surface 118 may each extend between the forward surface 112 and the rear surface 114. The outer surface 118 is radially spaced from the inner surface 116. Inner surface 116 may, when the shroud 102 is in engine 10, be exposed to the hot gas path 70, while outer surface 118 is thus radially spaced from the hot gas path 70. Shroud body 110 may extend generally circumferentially between a first side surface 150 and a second side surface 152, which may be generally circumferentially spaced from the first side surface. These surfaces generally extend axially between the front surface 112 and rear surface 114 of the shroud body 110.

Forward flange 120 and rear flange 130 may each extend from the shroud body 110, such as from the outer surface 118 thereof. Rear flange 130 may be axially spaced from forward flange 120. Further, forward flange 120 may be generally positioned proximate the forward surface 112 of the body 110, while rear flange 130 is generally positioned proximate the rear surface 114 of the body 110. Each flange 120, 130 may include a forward surface 122, 132 (respectively) and a rear surface 124, 134 respectively. As shown, the flanges 120, 130 may each extend generally circumferentially along their lengths, and thus be circumferentially oriented.

Further, one or more bore holes 126, 136 may be defined in each flange 120, 130, respectively. Each bore hole 126, 136 may, for example, extend generally axially through the associated flange 120, 130 between the associated forward surface 122, 132 and associated rear surface 124, 134. The bore holes 126, 136 are generally utilized for coupling the shroud 102 to the hanger 104. For example, pins may be inserted into the bore holes 126, 136 and associated bore holes of the hanger 104 to couple the shroud 102 to the hanger 104.

Referring to FIG. 3, an exemplary hanger 104 is illustrated. Hanger 104 generally is coupled to and supports the shroud 102 in the engine 10, and is itself supported by various other components in the engine 10. Hanger 104 may include a hanger body 160, and a forward hanger arm 162 and rear hanger arm 164 extending from the hanger body 160, such as radially outward (away from hot gas path 70) from the hanger body 160. Hanger body 160 may thus extend between the arms 162, 164. The rear arm 164 may be axially spaced from the forward arm 162, as shown.

Hanger 104 may further include one or more flanges extending from the hanger body 1650, such as radially inward (towards hot gas path 70) from the hanger body 160. For example, a forward flange 172 and a rear flange 174 may extend from the hanger body 160. Rear flange 174 may be axially spaced from forward flange 172. Forward flange 172 may be proximate forward hanger arm 162 and rear flange 174 may be proximate rear hanger arm 164. One or more bore holes 176, 178 may be defined in the flanges 172, 174, respectively.

When assembled, the bore holes 126, 136 of the shroud flanges 120, 130 may generally align with the associated hanger bore holes 176, 178. For example, bore holes 126 may align with bore holes 176, and bore holes 136 may align with bore holes 178. One or more pins 180 may be inserted through and thus extend through the associated bore holes to couple the hanger 104 and shroud 102 together. In some embodiments as shown, a pin 180 may extend through aligned bore holes 126, 176, 136 and 178. Alternatively, separate pins may be utilized for aligned bore holes 126, 176 and aligned bore holes 136, 178.

Referring again to FIGS. 4 and 5, in exemplary embodiments, a cooling passage 200 may be defined in the shroud 102. The cooling passage 200 may extend generally circumferentially through the shroud 102, and may facilitate cooling of surrounding portions of the shroud 102 and reductions in thermal gradients in the shroud 102 due to such cooling. Fluid from external to the hot gas path, for example, may be flowed into and through the cooling passage 200. The fluid may, for example, be air diverted from a flow path to the combustion section 26 for combustion therein.

Notably, the term "generally circumferential" or "generally circumferentially" refers to circumferential directions as well as directions that are angled from a circumferential direction by 5 degrees or less, such as 2 degrees or less, such as one degree or less. For example, at any point along the length of a generally circumferentially extending component, the component at that point may be angled from a circumferential direction by 5 degrees or less, such as 2 degrees or less, such as one degree or less. Further, a generally circumferentially extending component may extend linearly or curvilinearly within such angle range.

In exemplary embodiments, the cooling passage 200 may be defined in, and thus extend generally circumferentially through the shroud body 110. Alternatively, the cooling passage 200 may be partially defined in the shroud body 110 and partially defined in the forward flange 120 or rear flange 130, or may be defined in the forward flange 120 or rear flange 130. In exemplary embodiments, the cooling passage 200 may extend between the first side surface 150 and the second side surface 152 of the shroud body 110, such that a first end 202 of the cooling passage 200 is defined in the first side surface 150 and a second end 204 of the cooling passage 200 is defined in the second side surface 152. Alternatively, the first and second ends 202, 204 may be defined in opposing side surfaces of the forward flange 120 or rear flange 130. In alternative embodiments, first end 202 and/or second end 204 need not be defined in side surface of the shroud 102, and rather may be embedded within the shroud body 110.

Further, as illustrated, in exemplary embodiments the cooling passage 200 is disposed adjacent the rear flange 130, such as relatively proximate the rear flange 130 relative to the forward flange 120. In particular exemplary embodiments as illustrated, the cooling passage 200 may be axially aligned (i.e. at the same location along the axial direction) with the rear flange 130. Such alignment may be in the circumferential—radial plane, as shown. In alternative embodiments, the cooling passage 200 may be disposed adjacent the forward flange 120, such as relatively proximate the forward flange 120 relative to the rear flange 130. In particular exemplary embodiments as illustrated, the cooling passage 200 may be axially aligned with the forward flange 120. Such adjacent positioning, and optionally radial alignment, may exist throughout the length of the cooling passage 200 as shown.

As further illustrated in FIG. 5, in exemplary embodiments one or more feed passages 210 may be defined in the shroud 102. Each feed passage 210 may be in fluid communication with the cooling passage 200. Accordingly, cooling fluid may be flowed through the feed passages 210 to the cooling passage 200. For example, each feed passage 210 may extend between a first end 212 and a second end 214. The second end 214 may be in fluid communication with the cooling passage 200, such that cooling fluid exhausts from the second end 214 into the cooling passage 200. The first end 212 may be defined in a suitable location for receiving the cooling fluid. For example, as illustrated, first ends 212 may be defined in the rear flange 130, such as the forward surface 132 thereof. Alternatively, first ends 212 may be defined in the outer surface 118 or in the forward flange 120, such as the rear surface 124 thereof.

In exemplary embodiments, each feed passage 210 may extend at least partially through the rear flange 130 (as shown) or the forward flange 120. For example, each feed passage 210 may extend partially through the rear flange 130 and partially through the body 110 as shown (or alternatively may extend partially through the forward flange 120 and partially through the body 110) to connect with the cooling passage 200.

As discussed, the shroud body 110, forward flange 120 and rear flange 130 are in exemplary embodiments formed from a ceramix matrix composite ("CMC") material. In exemplary embodiments, and referring now to FIGS. 6 through 8, the shroud body 110, forward flange 120 and rear flange 130 may thus in exemplary embodiments be formed from a plurality of ceramic matrix composite plies 220. Each ply 220 may in some embodiments include fibers, such as ceramic fibers, embedded in a ceramix matrix. The fibers may be continuous fibers (extending through an entire length of the ply) or discontinuous fibers (extending through only a portion of a length of the ply).

Figure 8:
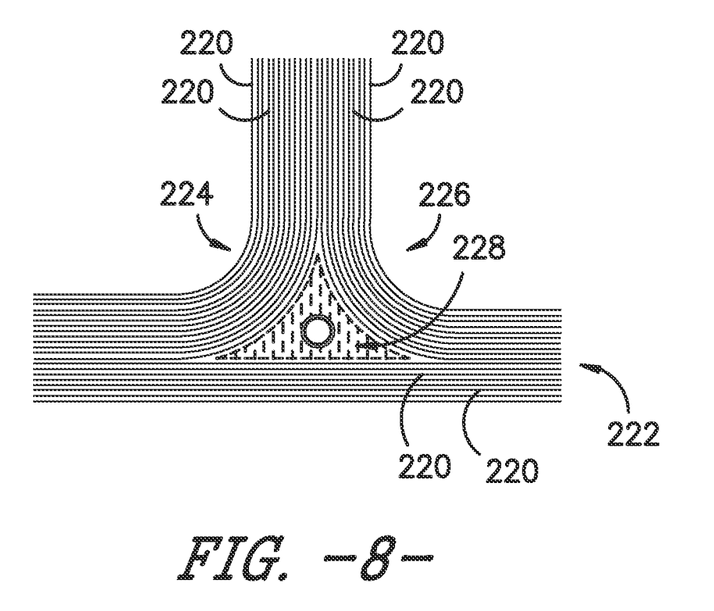
FIG. 8 is a cross-sectional view of a portion of a formed turbine component in accordance with one embodiment of the present disclosure.

In some embodiments, as illustrated in FIG. 8, a plurality of plies 220 may be utilized to form the shroud 102 and components thereof, such as the shroud body 110, forward flange 120 and rear flange 130. For example, one or more ply components may be provided and assembled to form the shroud 102. Each ply component may include a stacked plurality of plies 220. The plies 220 of each ply component may, for example, be stacked in one or more suitable directions. For example, a first ply component 222 may include a plurality of plies 220 which are stacked along the radial direction. A second ply component 224 may include a plurality of plies which are bent such that a portion of each plurality of plies is stacked along the radial direction and a portion of the plurality of plies is stacked along the axial direction. A third ply component 226 may similarly include a plurality of plies which are bent such that a portion of each plurality of plies is stacked along the radial direction and a portion of the plurality of plies is stacked along the axial direction. The axially stacked portions of the second and third ply components 224, 226 may face each other and form at least a portion of a flange, such as the forward flange 120 or rear flange 130. The first ply component 224 and the radially stacked portions of the second and third ply components 224, 226 may form at least a portion of the body 110.

It should be understood that the stacked pluralities of plies 220, and portions thereof, may extend along any suitable directions. For example, a stacked plurality of plies 220 of the first, second and/or third ply component 222, 224, 226, or a portion thereof, may extend along the radial direction, axial direction, circumferential direction, or at any suitable angle between radial and axial, radial and circumferential, or axial and circumferential.

Additionally, a filler component 228 of ceramic matrix composite material, which may be formed from one or more plies and conventionally known as a "noodle", may be provided to fill a void between the components 222, 224, 226. The plies of the filler component 228 need not be stacked and need not have any particular orientation. Notably, cooling passage 200 may in some embodiments be defined in the filler component 228, as illustrated.

Filler component 228 generally may have an outer contour that corresponds to the void between the various components 222, 224, 226. Accordingly, filler component 228 may be positioned at least partially between the first and second ply components 222, 224, the second and third ply components 224, 226, and the first and third ply components 222, 226, and may be positioned between the first, second and third ply components 222, 224, 226.

Referring now to FIGS. 6 through 9, the present disclosure may further be directed to methods 300 for forming turbine components for gas turbine engines 10. In some embodiments, a turbine component in accordance with the present disclosure may be a shroud 102. It should be understood, however, that turbine components in accordance with the present disclosure are not limited to shrouds 102, and rather may include any suitable components in a gas turbine engine 10 which require cooling passages to be formed therein. For example, a turbine component may alternatively be a rotor blade, stator vane, or other suitable hot gas path component.

Figure 9:
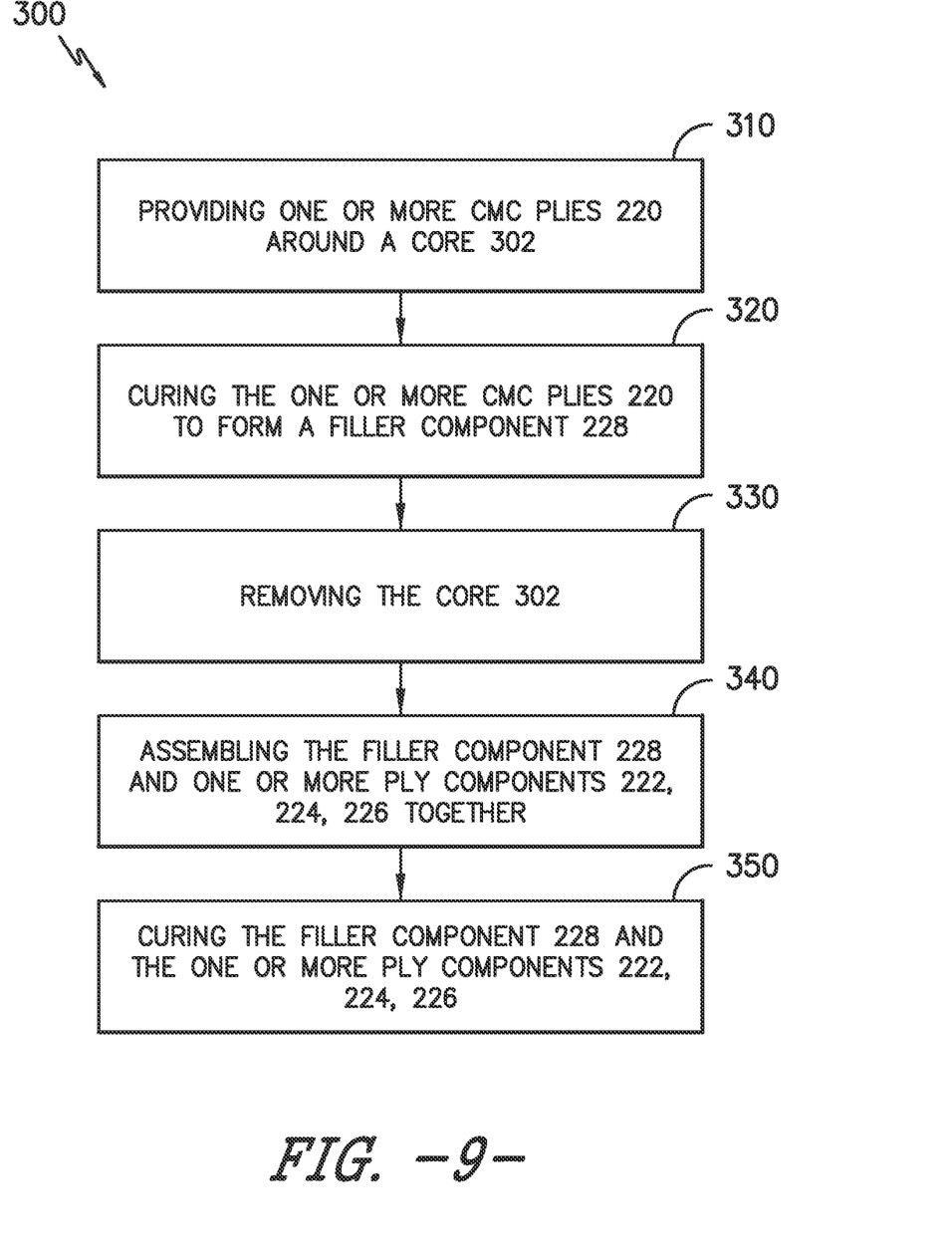
FIG. 9 is a flow chart illustrating a method for forming a turbine component in accordance with one embodiment of the present disclosure.

Method 300 may include, for example, the step 310 of providing one or more CMC plies 220 around a core 302. The core 302 may, for example, have the size and shape of a cooling passage 200 to be formed in the resulting turbine component. In exemplary embodiments, the core 302 may be formed from a suitable metal. Alternatively, core 302 may be formed from a ceramic, graphite, or other suitable material. The plies 220 may be wrapped around the core 302 or otherwise positioned about the core 302 such that a body of the core 302 (and, optionally, opposing ends thereof) are surrounded by the plies 220. Notably, plies 220 that are provided around core 302 need not be stacked in any particular orientation, or stacked at all. Further, plies 220 that are provided around core 302 may or may not include fibers. In some embodiments, for example, one or more plies 220 may rolled up around the core 302 or rolled up and pressed against the core 302, and other plies 220 may be provided against these plies 220.

Method 300 may further include, for example, the step of applying a release agent 304 to the core 302. The release agent 304 may be a layer that is wrapper around the core 302 or an aerosol that is sprayed on the core 302, and in exemplary embodiments may be formed from porous fiberglass cloth which may include a polytetrafluoroethylene-based (for example, Teflon) coating thereon. Release agent 304 may thus be disposed between the core 302 and plies 220. Release agent 304 may facilitate the release and removal of the core 302 from the plies 220 after curing thereof.

Figure 6:
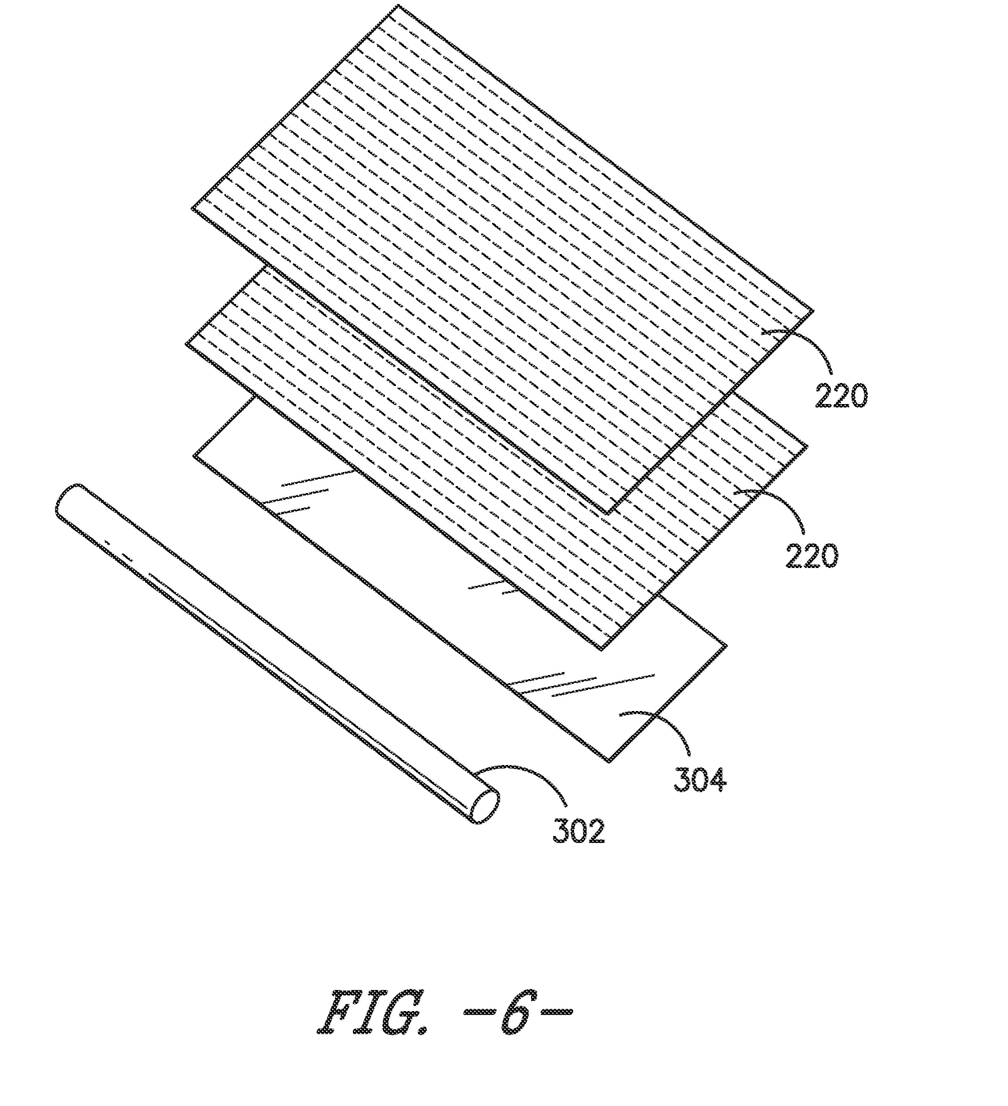
FIG. 6 illustrates various components utilized when forming a turbine component in accordance with one embodiment of the present disclosure.
Figure 7:
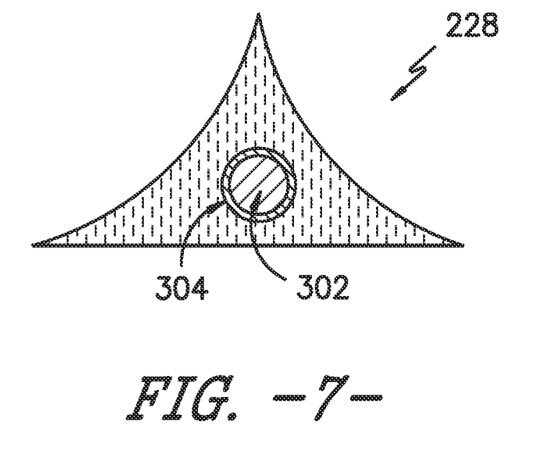
FIG. 7 is a cross-sectional view of a filler component formed during forming a turbine component in accordance with one embodiment of the present disclosure.

FIG. 6 illustrates one embodiment of a core 302, release agent 304 and plies 220 before applying of the agent 304 and providing of the plies 220 around the core 302. FIG. 7 illustrates the release agent 304 applied to the core 302 and the plies 220 provided around the core 302.

Method 300 may further include, for example, the step 320 of curing the one or more CMC plies 220 to form a filler component 228. Curing may be performed for a suitable time period at a suitable temperature for the CMC material, as is generally understood. FIG. 7 illustrates the filler component 228 after step 320.

Method 300 may further include, for example, the step 330 of removing the core 302 from the filler component 228. Such removal may occur after step 320. With core 302 removed, a cooling passage 200 may be defined in its place in the filler component 228.

Method 300 may further include, for example, the step 340 of assembling the filler component 228 and one or more ply components 222, 224, 226 together. The components 222, 224, 226, 228 may be assembled to form at least a portion of the turbine component. For example, the components 222, 224, 226, 228 may be assembled in a suitable jig or mold in the shape of at least a portion of the turbine component. When assembled, for example, the filler component 228 may be positioned at least partially between various ply components, as discussed herein.

Method 300 may further include, for example, the step 350 of curing the filler component 228 and the one or more ply components 222, 224, 226, such as after step 340. Curing of the components 222, 224, 226, 228 may form the turbine component. Curing may be performed for a suitable time period at a suitable temperature for the CMC material, as is generally understood. FIG. 8 illustrates a portion of one embodiment of the turbine component after steps 330, 340 and 350.

Method 300 may further include, for example, the step of forming one or more feed passages 210 in the turbine component. Such step may occur, for example, after step 350, and may include drilling or otherwise removing material from the turbine component to form the feed passages 210.

Notably, various steps of a method in accordance with the present disclosure may be performed in a variety of suitable orders. For example, in some embodiments, step 320 may follow step 310, step 340 may follow step 320, and step 350 may follow step 340. Step 330 may in these embodiments occur after step 320, after step 340, or after step 350. In other embodiments, steps 310 and 340 may be performed, and steps 320 and 350 may follow steps 310 and 340 and, for example be performed together. Step 330 may in these embodiments occur after steps 320 and 350. Alternatively, other suitable orders of the various steps as disclosed herein may be utilized.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shroud assembly for a gas turbine engine, the shroud assembly comprising:
    a plurality of shrouds arranged in an annular ring around an annular array of rotor blades, each shroud of the plurality of shrouds comprising:
        a shroud body comprising a forward surface, a rear surface axially spaced from the forward surface, an inner surface extending between the forward surface and the rear surface, an outer surface extending between the forward surface and the rear surface and radially spaced from the inner surface, a first side surface extending between the forward surface and the rear surface, and a second side surface circumferentially spaced from the first side surface,
        a forward flange extending from the outer surface of the shroud body,
        a rear flange extending from the outer surface of the shroud body, the rear flange axially spaced from the forward flange, and
        a cooling passage defined in the shroud, the cooling passage extending generally circumferentially through the shroud defining a first open cooling passage end in the first side surface and a second open cooling passage end in the second side surface, the cooling passage lying entirely on a radial plane, wherein each cooling passage of the plurality of shrouds is aligned in the annular ring.

2. The shroud assembly of claim 1, wherein the cooling passage is defined in the shroud body.

3. The shroud assembly of claim 1, wherein the cooling passage is disposed adjacent the rear flange.

4. The shroud assembly of claim 3, wherein the cooling passage is axially aligned with the rear flange.

5. The shroud assembly of claim 1, further comprising a plurality of feed passages defined in the shroud, each of the plurality of feed passages in fluid communication with the cooling passage.

6. The shroud assembly of claim 5, wherein each of the plurality of feed passages extends at least partially through one of the rear flange or the forward flange.

7. The shroud assembly of claim 6, wherein each of the plurality of feed passages extends at least partially through the rear flange.

8. The shroud assembly of claim 5, wherein each of the plurality of feed passages extends between a first end defined in a forward surface of the rear flange and a second end in fluid communication with the cooling passage.

9. The shroud assembly of claim 1, wherein the shroud body, the forward flange and the rear flange are formed from a ceramic matrix composite material.

10. A gas turbine engine, comprising:
a compressor;
a combustion section;
a turbine; and
a shroud assembly comprising a plurality of shrouds disposed in an annular ring around one of the compressor or the turbine, each shroud of the plurality of shrouds comprising:
a shroud body comprising a forward surface, a rear surface axially spaced from the forward surface, an inner surface extending between the forward surface and the rear surface, an outer surface extending between the forward surface and the rear surface and radially spaced from the inner surface, a first side surface extending between the forward surface and the rear surface, and a second side surface circumferentially spaced from the first side surface, and
a cooling passage defined in the shroud, the cooling passage extending generally circumferentially through the shroud defining a first open cooling passage end in the first side surface and a second open cooling passage end in the second side surface, the cooling passage lying entirely on a radial plane, wherein each cooling passage of the plurality of shrouds is aligned in the annular ring.

11. The gas turbine engine of claim 10, wherein the cooling passage is defined in the shroud body.

12. The gas turbine engine of claim 10, wherein the shroud further includes a forward flange extending from the outer surface of the shroud body and a rear flange extending from the outer surface of the shroud body, the rear flange axially spaced from the forward flange.

13. The gas turbine engine of claim 12, wherein the cooling passage is disposed adjacent the rear flange.

14. The gas turbine engine of claim 12, wherein the shroud body, the forward flange and the rear flange are formed from a ceramic matrix composite material.

15. A shroud for a shroud assembly of a gas turbine engine, the shroud comprising:
a shroud body comprising a forward surface, a rear surface axially spaced from the forward surface, an inner surface extending between the forward surface and the rear surface, an outer surface extending between the forward surface and the rear surface and radially spaced from the inner surface, a first side surface extending between the forward surface and the rear surface, and a second side surface circumferentially spaced from the first side surface;
a forward flange extending from the outer surface of the shroud body;
a rear flange extending from the outer surface of the shroud body, the rear flange axially spaced from the forward flange; and
a cooling passage defined in the shroud, the cooling passage extending generally circumferentially through the shroud defining a first open cooling passage end in the first side surface and a second open cooling passage end in the second side surface, the cooling passage lying entirely on a radial plane.

16. The shroud of claim 15, wherein the cooling passage is defined in the rear flange.

17. The shroud of claim 15, wherein the cooling passages defined in the forward flange.

18. The shroud of claim 15, further comprising a plurality of feed passages defined in the shroud, each of the plurality of feed passages in fluid communication with the cooling passage.

19. The shroud of claim 18, wherein each of the plurality of feed passages extends at least partially through one of the rear flange or the forward flange.

20. The shroud of claim 19, wherein each of the plurality of feed passages extends at least partially through the rear flange.

* * * * *